United States Patent
Wang et al.

(10) Patent No.: US 12,462,805 B2
(45) Date of Patent: Nov. 4, 2025

(54) NATURAL LANGUAGE GENERATION

(71) Applicant: Amazon Technologies, Inc., Seattle, WA (US)

(72) Inventors: Hann Wang, Santa Clara, CA (US); Angeliki Metallinou, Mountain View, CA (US); Melanie C B Gens, Honolulu, HI (US); Arijit Biswas, Dublin, CA (US); Ying Shi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 256 days.

(21) Appl. No.: 18/345,455

(22) Filed: Jun. 30, 2023

(65) Prior Publication Data

US 2025/0006196 A1    Jan. 2, 2025

(51) Int. Cl.
*G10L 15/26* (2006.01)
*G10L 13/08* (2013.01)

(52) U.S. Cl.
CPC .............. *G10L 15/26* (2013.01); *G10L 13/08* (2013.01)

(58) Field of Classification Search
CPC ...... G06F 3/167; G06F 40/216; G06F 40/242; G06F 40/295; G06F 40/30; G06F 40/35; G06F 40/40; G06F 40/44; G06F 3/013; G06F 3/0481; G06N 3/09; G06N 20/00; G10L 13/08; G10L 13/10; G10L 15/063; G10L 15/07; G10L 15/22; G10L 15/26; G10L 15/32; G10L 15/02; G10L 15/16; G10L 15/197; G10L 15/30; G10L 15/065
See application file for complete search history.

(56) References Cited

U.S. PATENT DOCUMENTS

| | | | | |
|---|---|---|---|---|
| 11,314,942 | B1 * | 4/2022 | Selfridge | G10L 15/22 |
| 11,341,972 | B2 * | 5/2022 | Gruenstein | G10L 15/32 |
| 11,847,424 | B1 * | 12/2023 | Harkous | G06N 20/00 |
| 12,197,871 | B2 * | 1/2025 | Bhowmik | G06F 40/295 |
| 2017/0169813 | A1 * | 6/2017 | Suzuki | G10L 15/197 |

(Continued)

OTHER PUBLICATIONS

International Search Report and Written Opinion mailed Apr. 24, 2024, for International Patent Application No. PCT/US2024/013918.

(Continued)

Primary Examiner — Gerald Gauthier
(74) Attorney, Agent, or Firm — Pierce Atwood LLP

(57) ABSTRACT

Techniques for generating a prompt for a language model to determine an action responsive to a user input, are described. In some embodiments, the system receives a user input, determines one or more application programming interfaces (APIs) configured to perform actions that are relevant to the user input and exemplars representing examples of using the APIs with respect to user inputs similar to the current user input. The system further determines device states of devices that are determined to be related to the user input and also determines other contextual information (e.g., weather information, time of day, geographic location, etc.). The system generates a prompt including the user input, the APIs, the exemplars, the device states, and the other contextual information. A language model processes the prompt to determine an action responsive to the user input and the system causes performance of the action.

20 Claims, 10 Drawing Sheets

(56) References Cited

U.S. PATENT DOCUMENTS

| | | | | |
|---|---|---|---|---|
| 2020/0302916 | A1* | 9/2020 | Mengibar | G10L 15/07 |
| 2021/0280177 | A1* | 9/2021 | Chao | G10L 15/32 |
| 2021/0343274 | A1* | 11/2021 | Kang | G10L 15/197 |
| 2021/0398524 | A1* | 12/2021 | Gao | G06F 40/35 |
| 2022/0084510 | A1* | 3/2022 | Peng | G10L 15/063 |
| 2022/0084511 | A1* | 3/2022 | Nickson | G10L 15/063 |
| 2022/0246139 | A1* | 8/2022 | Metallinou | G10L 15/16 |
| 2022/0343903 | A1* | 10/2022 | Mostafazadeh | G06F 3/0481 |
| 2022/0358908 | A1* | 11/2022 | Gandhe | G10L 15/065 |
| 2023/0110205 | A1* | 4/2023 | Guo | G10L 15/197 |
| | | | | 704/235 |
| 2023/0377574 | A1* | 11/2023 | McCraw | G10L 15/30 |
| 2024/0169974 | A1* | 5/2024 | Bonar | G10L 13/10 |
| 2024/0274123 | A1* | 8/2024 | Zhang | G10L 15/02 |
| 2024/0346254 | A1* | 10/2024 | Liu | G06F 40/40 |
| 2024/0362417 | A1* | 10/2024 | Imani | G06N 3/09 |
| 2024/0370658 | A1* | 11/2024 | Zhang | G06F 40/242 |
| 2025/0006196 | A1* | 1/2025 | Wang | G06F 40/44 |

OTHER PUBLICATIONS

King, et al., "Sasha: Creative Goal-Oriented Reasoning in Smart Homes With Large Language Models", Proceedings of the ACM on Interactive, Mobile, Wearable and Ubiquitous Technologies 8.1 (2024): 1-38.

King, et al., "'Get ready for a party': Exploring smarter smart spaces with help from large language models", arXiv preprint arXiv:2303.14143 (2023).

Schick, et al., "Toolformer: Language Models Can Teach Themselves to Use Tools", Advances in Neural Information Processing Systems 36 (2024).

Liang, et al., "TaskMatrix.AI: Completing Tasks by Connecting Foundation Models with Millions of APIs", arXiv preprint arXiv:2303.16434 (2023).

Mialon, et al., "Augmented Language Models: a Survey", arXiv preprint arXiv:2302.07842 (2023).

* cited by examiner

NATURAL LANGUAGE GENERATION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
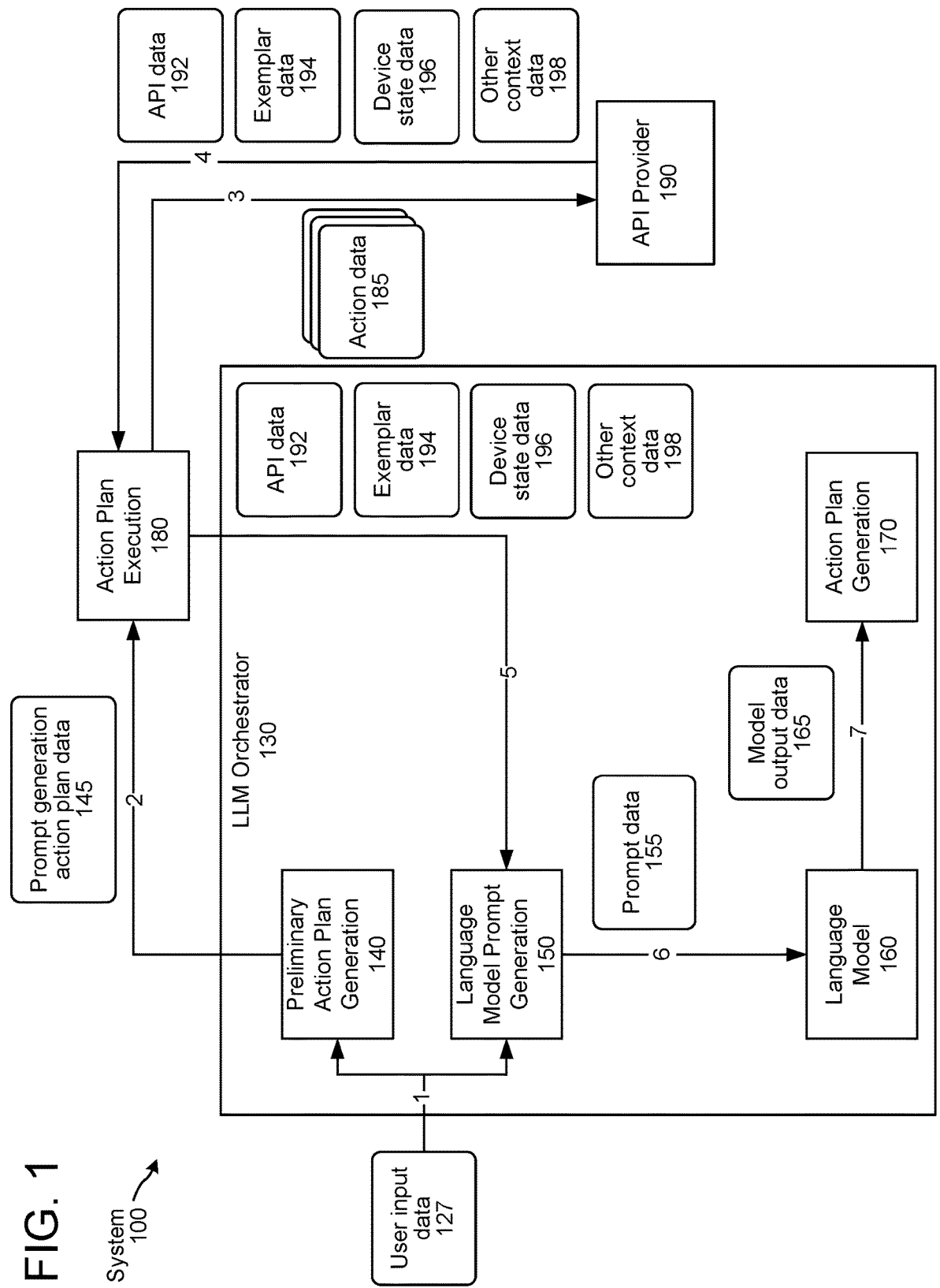
FIG. 1 is a conceptual diagram illustrating example components and processing of a system for generating a prompt usable by a language model to determine an action responsive to a user input, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. In some embodiments, NLU processing and NLG processing may be logical subcomponents of natural language processing (NLP).

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some instances, the system may be configured to process the ASR data using a language model (e.g., a large language model (LLM)) to determine the action responsive to the user input. For example, in response to the user input "Make sure outdoor lights are on anytime we open the garage," the system may use the language model to determine to that the user wants to create a routine that causes the outdoor lights to turn on when the garage door is opened. Thereafter, the language model may generate an output indicating one or more application programming interface (API) calls to cause creation of the routine, the system may execute the API calls, and the language model may generate a response informing the user that, from now on, the outdoor lights will be turned on when the garage door opens. As used herein, an "API call" is an instruction/request for the corresponding API to perform a particular action (e.g., an API call of turn_on_device (device="indoor light 1") corresponds to an instruction/request to an API to turn on a device associated with the identifier "indoor light 1"). The language model may be guided to the desired result by providing an appropriate 'prompt' to the language model. For example, the system may be configured to prompt the language model using data associated (e.g., API definitions) with a user input in order to determine an action responsive to the user input.

The present disclosure provides techniques for generating a prompt including a user input and various information determined to be relevant for processing of the user input, which is to be provided to a language model for determining an action responsive to the user input. The various other information determined to be relevant for processing of the user input by the language model may include API definitions representing actions performable by APIs determined to be related to the user input (e.g., related to the action being requested), relevant examples of using the APIs with respect to similar user inputs (e.g., exemplars for one-shot/few-shot learning by the language model), relevant contexts such as device states corresponding to devices related to the user input (e.g., related to the action being requested) and/or other relevant contextual information (e.g., user profile information, device profile information, weather, time of day, user behaviors, historical interaction history, etc.) etc.), as well as define how the output of the model should be formatted. Including such information in the prompt enables the language model to identify the most appropriate action responsive to the user input (e.g., the most appropriate action performable by the API). For example, the language model can use the exemplars and the API definitions to identify the most appropriate action (e.g., API) to be performed in response to the user input. The language model can further use the contextual information (e.g., device states and other contextual information) to generate an executable API call, and the system may execute the action corresponding to the API call. Including information in the prompt that is already determined to be relevant for processing of the user input by the language model increases the efficiency and accuracy of the language model because it enables the language model to perform one-shot/few-shot learning using only information determined to be relevant for processing of the current problem by the language model. This further prevents the language model from having to consider irrelevant information when determining the action responsive to the user. Such preprocessing further shortens the length of the prompt provided to the language model by only including the top-n portions of relevant information, which may prevent the degradation in accuracy of the language model that may accompany lengthy prompts.

Teachings of the present disclosure provide, among other things, an improved user experience by providing a system capable of automatically generating a language model prompt for causing a language model to determine an action responsive to a user input, where the language model prompt includes the relevant information needed to determine the action (e.g., relevant API definitions, relevant exemplars, relevant device states, other relevant contextual information) and cause performance of the action. Providing such a prompt further allows the language model to accurately determine an appropriate action to be performed that is responsive to the user input.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 including a large language model (LLM) orchestrator 130 and various other components for determining an action responsive to a user input. The system 100 may further include an action plan execution component 180 and an API provider component 190. With reference to FIG. 1, the LLM orchestrator 130 may include a preliminary action plan generation component 140, a language model prompt generation component 150, a language model 160, and an action plan generation component 170.

The language model 160 is a generative model. In some embodiments, the language model 160 may be an LLM. An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing.

In some embodiments where the language model 160 is an LLM, the language model 160 may be a transformer-based seq2seq model involving an encoder-decoder architecture. In some such embodiments, the language model 160 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model 160 may be pre-trained for approximately 1 trillion tokens. Being trained on CLM tasks, the language model 160 may be capable of in-context learning. An example of such a LLM is Alexa Teacher Model (Alexa™).

In embodiments where the language model 160 is an LLM, the input to the LLM may be in the form of a prompt. A prompt may be a natural language input, for example, an instruction, for the LLM to generate an output according to the prompt. The output generated by the LLM may be a natural language output responsive to the prompt. The prompt and the output may be text in a particular language (e.g., English, Spanish, German, etc.). For example, for an example prompt "how do I cook rice?", the LLM may output a recipe (e.g., a step-by-step process) to cook rice. As another example, for an example prompt "I am hungry. What restaurants in the area are open?", the LLM may output a list of restaurants near the user that are open at the time.

The language model 160 may be configured using various learning techniques. For example, in some embodiments, the language model 160 may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language model 160 may be configured using one-shot learning, which is similar to few-shot learning, except the model is provided with a single example. As another example, in some embodiments, the language model 160 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LLM orchestrator 130 may be configured for generating the prompt to be used by the language model 160 to determine an action responsive to a user input. As shown in FIG. 1, the LLM orchestrator 130 receives (at step 1) user input data 127. In some instances, the user input data 127 may correspond to a text or tokenized representation of a user input. For example, prior to the LLM orchestrator 130 receiving the user input data 127, another component (e.g., an automatic speech recognition (ASR) component 650) of the system 100 may receive audio data representing the user input. The ASR component 650 may perform ASR processing on the audio data to determine ASR data corresponding to the user input. As described below, with respect to FIG. 6, the ASR component 650 may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's 650 level of confidence that the corresponding hypothesis represents what the user said. The ASR component 650 may also determine token scores corresponding to each token/word of the ASR hypothesis, where the token score indicates the ASR component's 650 level of confidence that the respective token/word was spoken by the user. The token scores may be identified as an entity score when the corresponding token relates to an entity. In some instances, the user input data 127 may include a top scoring ASR hypothesis of the ASR data.

As illustrated in FIG. 1, the user input data 127 may be received at the preliminary action plan generation component 140 and the language model prompt generation component 150 of the LLM orchestrator 130. The preliminary action plan generation component 140 processes the user input data 127 to generate prompt generation action plan data 145 corresponding to an instruction(s) (e.g., a request(s)) for one or more portions of data usable to generate a language model prompt for determining an action responsive to the user input. In some embodiments, the one or more portions of data may be data that is determined to be relevant for processing of the user input. The one or more portions of data may represent one or more actions (e.g., API definitions), one or more exemplars corresponding to the actions (e.g., example model outputs including an appropriate use of the API, as discussed in more detail herein below), one or more device states corresponding to one or more devices associated with the user input, and/or one or more other contexts associated with the user input. For example, if the user input data 127 represents a user input of "please turn on the kitchen lights every morning at 8 am," then the preliminary action plan generation component 140 may determine prompt generation action plan data 145 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. For further example, if the user input data 127 represents a user input of "What is the elevation of Mt. Everest," then the preliminary action plan generation component 140 may determine prompt generation action plan data 145 representing instructions for one or more actions (e.g., API definitions) related to the user input and one or more exemplars corresponding to the related actions, as other information, such as devices states or other contextual information (user profile information, device profile information, weather, time of day, historical interaction history) may not be relevant.

In some embodiments, the prompt generation action plan data 145 may include one or more executable API calls usable for retrieving the one or more portions of data from the corresponding component. For example, instructions included in the prompt generation action plan data 145 may include "FETCH_API," "FETCH_EXEMPLAR," "FETCH_DEVICE_STATE," "FETCH_CONTEXT," etc., along with optional API arguments/inputs. In some embodiments, the prompt generation action plan data 145 may also include the user input data 127. The prompt generation action plan data 145 may be sent (at step 2) to the action plan execution component 180.

In some embodiments, the preliminary action plan generation component 140 may be configured to process the user input data 127 to determine a representation of the user's request. For example, the if the user input data 127 represents a user input of "I have always wanted to travel to Japan, I have heard it's beautiful. How tall is Mt. Fuji?", then the preliminary action plan generation component 140 may determine the representation of the user's request as being "How tall is Mt. Fuji," or the like. The preliminary action plan generation component 140 may generate the prompt generation action plan data 145 using the determined representation of the user's request.

In some embodiments, the preliminary action plan generation component 140 may implement one or more machine learning (ML) models. A first ML model(s) may be configured to take as input the user input data 127 and generate a representation of the user's request. For example, the ML model may be a text summarization model or a text rewrite model. A second ML model (or the first ML model) may be configured to take as input the representation of the user's request (or the user input data 127) and determine the one or more portions of data relevant for processing of the user input. For example, the second ML model may be a classifier trained to classify the user's request (or the user input data 127) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.)

In other embodiments, the preliminary action plan generation component 140 may be a LLM, similar to the language model 160. In such embodiments, the system 100 may include a further component configured to generate a prompt to be provided to the LLM (e.g., similar to the language model prompt generation component 150) or the prompt may be generated by the language model prompt generation component 150. The component may generate a prompt (e.g., according to a template) including the user input data 127 and instructions to determine the one or more portions of data (or types of data) relevant to the processing of the user input. The LLM may process the prompt and generate model output data representing the one or more portions of data (or types of data). The preliminary action plan generation component 140 may process the model output data to determine the prompt generation action plan data 145.

The action plan execution component 180 may process the prompt generation action plan data 145 to execute the one or more instructions to retrieve/receive data corresponding to the user input and that may be used to generate the language model prompt. As shown in FIG. 1, the action plan execution component 180 processes the prompt generation action plan data 145 to generate action data 185 representing an action included in the prompt generation action plan data 145 (e.g., a single instruction, such as FETCH_CONTEXT). For example, in the situation where the action is represented by an API call, the action data 185 may represent the action plan execution component 180 executing the API call included in the prompt generation action plan data 145. The action data 185 may be sent (at step 3) to the API provider component 190. In the situation where the prompt generation action plan data 145 includes more than one instruction, the action plan execution component 180 may generate more than one instance of action data 185 (e.g., one instance for each instruction included in the prompt generation action plan data 145) and send each instance to the API provider component 190.

Figure 2:
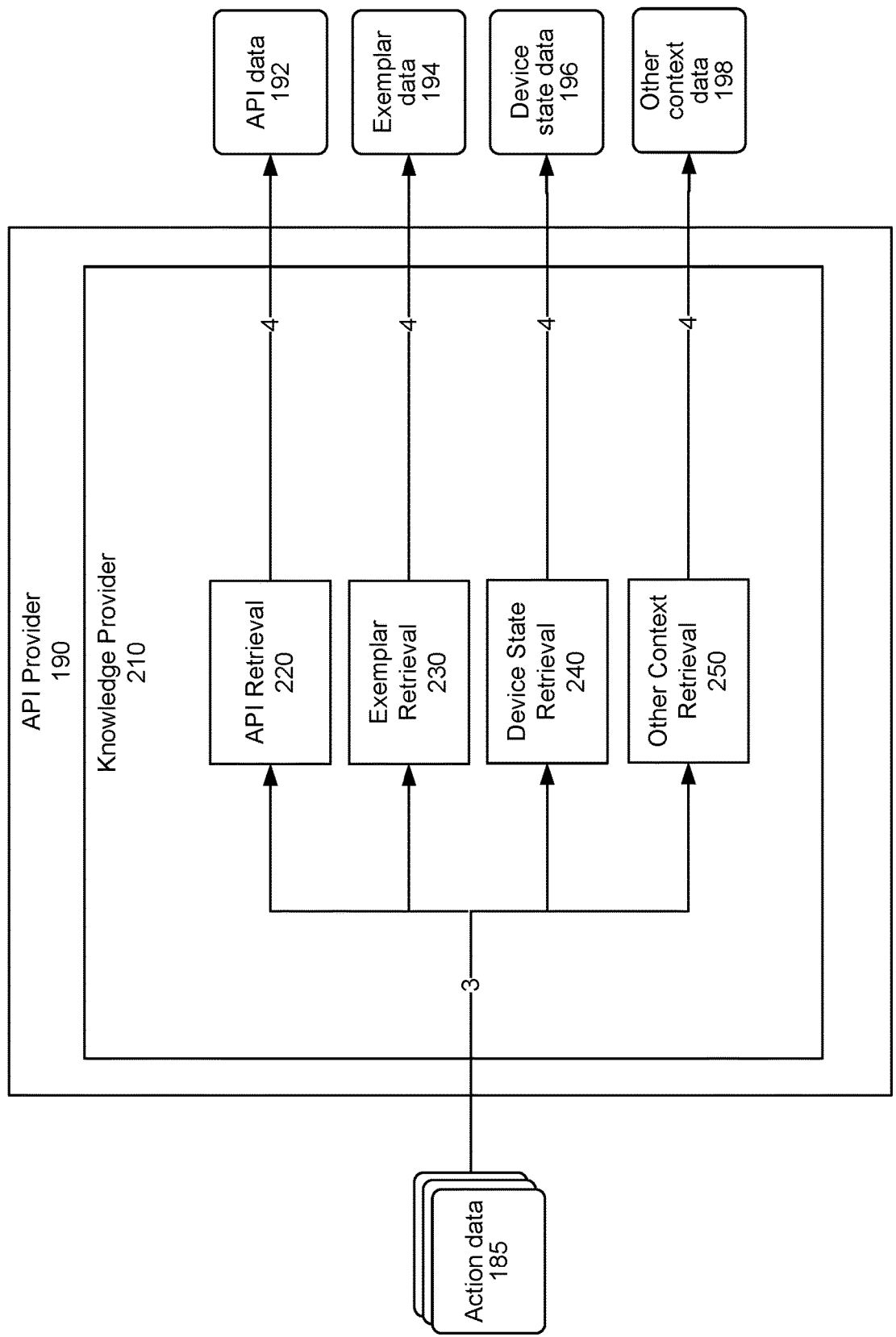
FIG. 2 is a conceptual diagram illustrating example processing of a knowledge provider component, according to embodiments of the present disclosure.

The API provider component 190 may process the (one or more instances of the) action data 185 and cause the retrieval of the (one or more portions of) data associated with the action data 185. With reference to FIG. 2, the API provider component 190 may include a knowledge provider component 210. The knowledge provider component 210 may include an API retrieval component 220, an exemplar retrieval component 230, a device state retrieval component 240, and an "other" context retrieval component 250. The knowledge provider component 210 may provide the action data 185 to the component(s) configured to determine the data corresponding to the request(s) represented by the action data 185.

For example, the API retrieval component 220 may process the action data 185 to generate API data 192 representing one or more APIs that correspond to an action performable with respect to the user input. For example, if the user input corresponds to "turn on the kitchen light," the API retrieval component 220 may determine an API usable to control a device and include an API definition corresponding to the API in the API data 192. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 192 based on them being semantically similar to the user input. For example, the API retrieval component 220 may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 192. In some embodiments, the API retrieval component 220 may include the top-n identified API definitions in the API data 192. The API data 192 may be sent (at step 4) to the action plan execution component 180 as shown in FIG. 1.

For further example, the exemplar retrieval component 230 may process the action data 185 to generate exemplar data 194 representing one or more exemplars associated with one or more APIs (e.g., the API represented by the API data 192). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component 230 may select an exemplar including the example user input of "please turn on the lights" and the API call of "turn_on_device (device="lights")." In some embodiments, an exemplar represented in the exemplar data 194 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action(device: str)" and "Routine.create_time_trigger(hour: [hour value])" and the current user input "please turn on the kitchen light every day at 7 am," the exemplar retrieval component 230 may select an exemplar representing:

{
Customer: turn on the kitchen light every day at 8pm
Thought: the customer is trying to create a routine
Action:
Routine.create_routine(trigger=Routine.create_time_trigger(hour=8), action=Routine.create_turn_on_action(device="kitchen light"))
Observation: routine created successfully
Thought: time to respond
Response: I have created a routine for you. Anything else?
}

Although not illustrated in FIG. 2, in some embodiments, the API provider component 190 and/or the knowledge provider component 210 may provide the exemplar retrieval component 230 with the action data 185 and a list of API call(s) to which the determined exemplars are to be associated (e.g., the API call(s) included in the API data 192). In some embodiments, the one or more exemplars may be included in the exemplar data 194 based on them being semantically similar to the user input. For example, the exemplar retrieval component 230 may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 194. In some embodiments, the exemplar retrieval component 230 may include the top-n identified exemplars in the exemplar data 194. The exemplar data 194 may be sent (at step 4) to the action plan execution component 180 as shown in FIG. 1.

As another example, the device state retrieval component 240 may process the action data 185 to generate device state data 196 representing one or more states of one or more devices associated with/relevant to the user input (e.g., whether the device is powered on or off, a volume level associated with the device, etc.). For example, if the user input corresponds to "Please turn on the kitchen light," the device state data 196 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device 110 (e.g., located in the kitchen) that received the user input may be used to determine the device state data 196. In some embodiments, the one or more devices may be determined to be relevant to the user input based on device profile information. For example, the device state retrieval component 240 may be capable of comparing device profile information for a device (e.g., device ID, device group ID, a location associated with the device, etc.) to the user input to determine whether the device is relevant to the user input. In some embodiments, the device state retrieval component 240 may include the top-n identified device states in the device state data 196. The device state data 196 may be sent (at step 4) to the action plan execution component 180 as shown in FIG. 1.

As a further example, the other context retrieval component 250 may process the action data 185 to generate other context data 198 representing one or more contexts associated with/relevant to the user input. For example, the other context data 198 may represent user profile information (age, gender, associated devices, user preferences, etc.), visual context (e.g., content being displayed by devices associated with the user profile, content being displayed by the user device 110 that captured the user input, etc.), knowledge context (e.g., one or more previous user inputs and/or system generated responses, etc.), time of day, geographic/device location, weather information, etc. In some embodiments, the other context retrieval component 250 may include the top-n identified context in the other context data 198. The other context data 198 may be sent (at step 4) to the action plan execution component 180 as shown in FIG. 1.

In some embodiments, the knowledge provider component 210 (or another component of the knowledge provider component 210) may be configured to cause one or more of the API retrieval component 220, the exemplar retrieval component 230, the device state retrieval component 240, and the other context retrieval component 250 to process based on the data output by one or more of the components of the knowledge provider component 210. For example, if the output of the API retrieval component 220 (e.g., the API data 192) indicates that a related API definition was identified, then the knowledge provider component 210 (or another component of the knowledge provider component 210) may cause the exemplar retrieval component 230 to process to determine one or more exemplars related to the identified API definitions. For further example, if the output of the API retrieval component (e.g., the API data 192) indicates that a particular API definition was identified (e.g., an API definition for controlling a device), then the knowledge provider component 210 (or another component of the knowledge provider component 210) may cause the exemplar retrieval component 230 to process as described above, and may further cause the device state retrieval component 240 and/or the other context retrieval component 250 to process to determine device states for one or more related devices and/or other contextual information based on the identified API definition being associated with controlling a device. In some embodiments, the knowledge provider component 210 (or another component of the knowledge provider component 210) may determine to cause the components to process based on instruction(s) included in the action data (e.g., based on a determination made by preliminary action plan generation component 140, as discussed above).

The action plan execution component 180 may send (step 5) the data received from the API provider component 190 (e.g., the API data 192, the exemplar data 194, the device state data 196, and the other context data 198) to the language model prompt generation component 150. The language model prompt generation component 150 may be configured to generate prompt data 155 (e.g., using the user input data 127, the API data 192, the exemplar data 194, the device state data 196, and/or the other context data 198) to be used by the language model 160.

In some embodiments, the language model prompt generation component 150 may generate the prompt data 155 representing a prompt for input to the language model 160. In some embodiments, such prompt data 155 may be generated based on combining the user input data 127, the API data 192, the exemplar data 194, the device state data 196, and the other context data 198. The prompt data 155 may be an instruction to determine an action(s) responsive to the user input data 127 given the other information (e.g., the API data 192, the exemplar data 194, the device state data 196, the other context data 198) included in the prompt data 155. In some embodiments, the language model prompt generation component 150 may also include in the prompt data 155 a sample processing format to be used by the language model 160 when processing the prompt and generating the response. In some embodiments, the prompt data 155 may be generated according to a template format. For example, the prompt data 155 may adhere to a template format of:

```
{
You have access to the following API's:
[API(s) (e.g., the API data 192)]
Use the following format:
User: the input utterance of a user
Thought: optionally think about what to do
Action: take an action by calling APIs
Observation: what the API execution returns
... (this thought/action/action input/observation can repeat N times)
Thought: done
Response: the proper response to the user (end of turn)
Examples:
[Exemplar(s) (e.g., the exemplar data 194)]
Context: [device state(s) (e.g., the device state data 196)] [other context(s) (e.g., the other context data 198)]
User: [the user input (e.g., the user input data 127)]
}
```

In some embodiments, the template format may instruct the language model 160 as to how it should process to determine the action responsive to the user input and/or how it should generate the output including the action response to the user input. For example, as shown in the example above, the format may include the label "User:" labelling the following string of characters/tokens as the user input. For further example, the format may include the label "Thought:" instructing the language model 160 to generate an output representing the determined interpretation of the user input by the language model 160 (e.g., the user is requesting [intent of the user input], the user is trying to [intent of the user Input], etc.) As another example, the format may include the label "Observation:" labeling the following string of characters/tokens as the result of performance of an action determined by the language model 160/the language model 160's interpretation of the result of the performance of the action determined by the language model 160. As a further example, the format may include a label of "Response:" instructing the language model 160 to generate a response (e.g., a natural language output for a user) to the prompt.

Following such a template format, for example, and for a user input of "turn on the living room light" and corresponding API data, exemplar data, device state data, and other context data, the language model prompt generation component 150 may generate example prompt data 155*a*:

```
{
You have access to the following API's:
Routine.turn_on_device (device: [device name]) turns a device on.
Use the following format:
User: the input utterance of a user
Thought: optionally think about what to do
Action: take an action by calling APIs
Observation: what the API execution returns
... (this thought/action/action input/observation can repeat N times)
Thought: done
Response: the proper response to the user (end of turn)
Examples:
User: turn on all indoor lights
Thought: the user is trying to turn lights on
Action: turn_on_device (device="indoor light 1")
turn_on_device (device="indoor light 2")
Observation: success success
Thought: time to respond
Response: Anything else I can help you with?
Context: the user has the following devices, bathroom light, bedroom light, kitchen light, and living room light.
User: turn on the living room light.
}
```

In some embodiments, the language model prompt generation component 150 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The language model 160 processes the prompt data 155 to generate model output data 165 representing an action responsive to the user input. For example, based on processing the example prompt data provided above, the language model 160 may output model output data 165: {"Thought: the user is trying to turn on the living room light; Action: turn_on_device (device="living room light"),"} or the like. The model output data 165 is sent (at step 7) to the action plan generation component 170. The action plan generation component 170 may parse the model output data 165 to determine action plan data (e.g., the action plan data 410 illustrated in FIG. 4) representing the action generated by the language model 160. For example, for the model output data 165: "Action: turn_on_device (device="living room light")," the corresponding action plan data may correspond to "turn_on_device (device=" living room light ")" (e.g., corresponding to the action generated by the language model 160, without the label of "Action"). In some embodiments, the action plan generation component 170 may determine an API call corresponding to the "Action" data included in the model output data 165. For example, in some embodiments, the action plan generation component 170 may fill in the arguments/inputs, if any, for the API call, which may be included in the action plan data 410. For further example, in some embodiments, the action plan execution component 180 may fill in the arguments/inputs, if any, for the API call. Further details regarding the processing of the action plan data are discussed below with respect to FIG. 4. Thereafter, in some embodiments, the system 100 may further process to, for example, perform the action and generate a response to the user input, as discussed below with respect to FIGS. 3-4.

In some embodiments, the LLM orchestrator 130 (e.g., the action plan generation component 170 or another component of the LLM orchestrator 130) may determine whether the language model 160 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LLM orchestrator 130 may use a knowledge base, web search, etc. to fact-check information included in the output.

Figure 3:
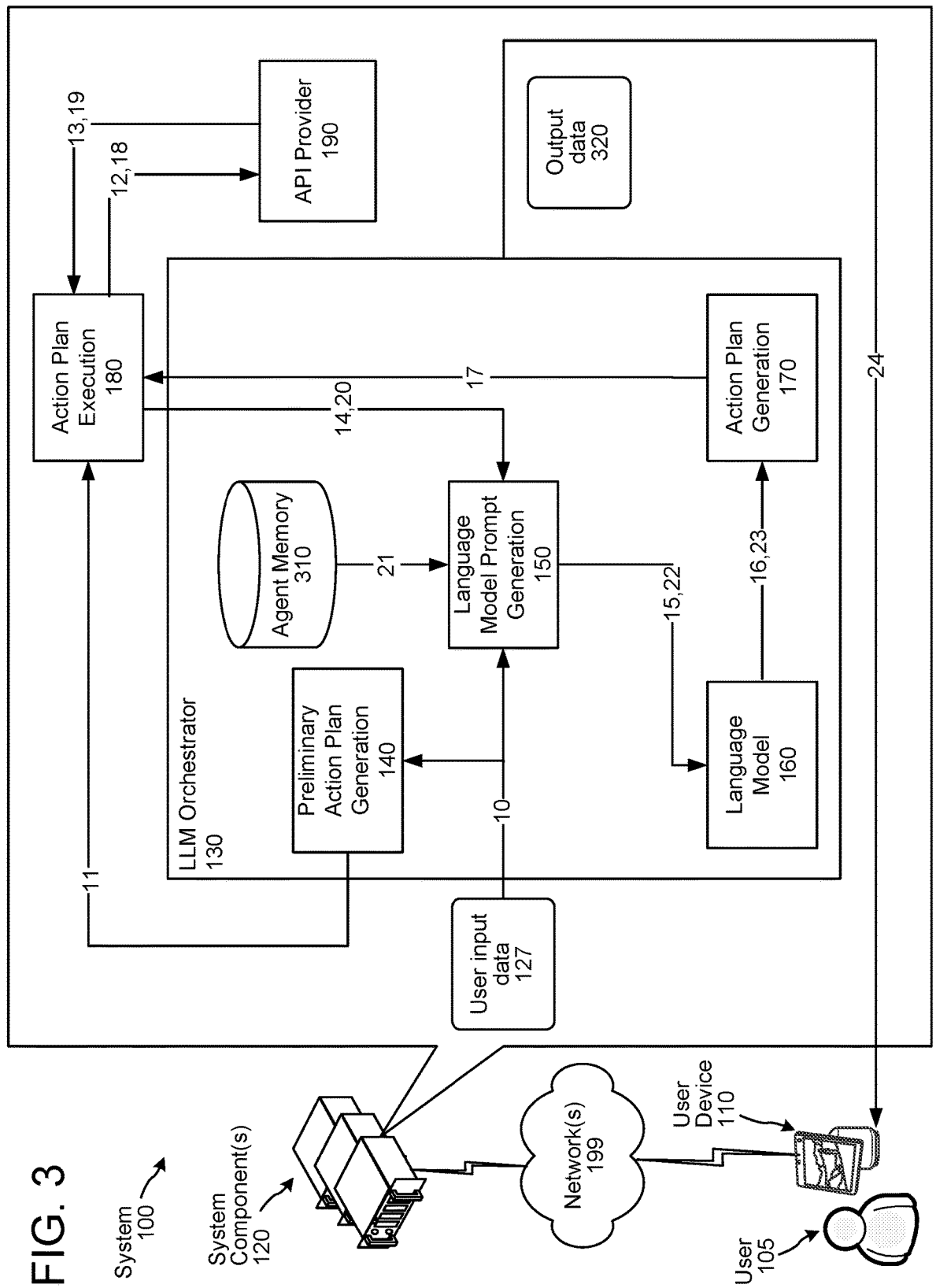
FIG. 3 is a conceptual diagram illustrating further example components and processing of the system for generating the prompt, according to embodiments of the present disclosure.

FIG. 3 illustrates example components and processing of the system 100 for processing a user input. As shown in FIG. 3, the system 100 may further include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components, such as the LLM orchestrator 130, the action plan execution component 180, and the API provider component 190. As shown in FIG. 3, the system 100 may process as described herein above with respect to FIGS. 1-2 to generate a prompt for the language model 160 and generate a model output data (e.g., the model output data 165, such as "Thought: the user is trying to turn on the living room light" Action: turn_on_device (device="living room light")), illustrated in FIG. 3 as steps 10-16. Thereafter, the system 100 may process the model output data 165 to generate an action plan representing the action to be performed, execute the action plan to perform the action, and generate a response to the user input, illustrated in FIG. 3 as steps 17-24 described in detail below.

Figure 4:
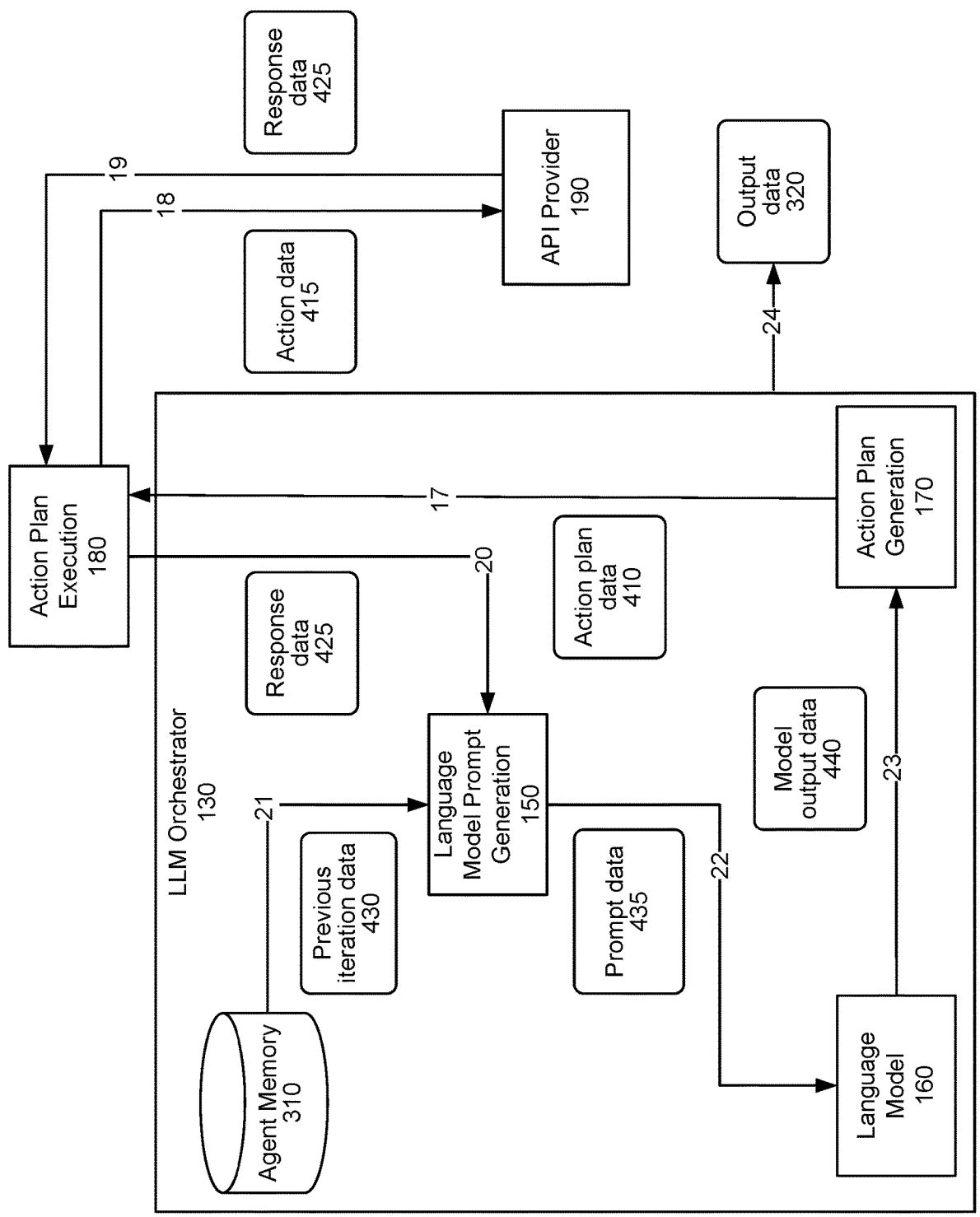
FIG. 4 is a conceptual diagram illustrating example processing performed by the system to cause performance of the action responsive to the user input, according to embodiments of the present disclosure.

As shown in FIG. 4, the action plan generation component 170 may process the model output data 165 generated by the language model 160 to generate action plan data 410. The action plan generation component 170 may, for example, parse the model output data 165 to determine the action determined by the language model 160 (e.g., "turn_on_device (device=" living room light ")") In some embodiments, the action plan generation component 170 may determine the action based on identifying a keyword included in the model output that is associated with the action determined by the language model 160 (e.g., "Action:"). The action plan generation component 170 may send (at step 17) action plan data 410 representing the determined action to the action plan execution component 180.

The action plan execution component 180 processes the action plan data 410 to cause one or more components of the API provider component 190 to perform the action(s) represented by the action plan data 410. For example, as shown in FIG. 4, the action plan execution component 180 may send (at step 18) action data 415 representing an API call corresponding to the action to the API provider component 190. The API provider component 190 may process to generate response data 425 representing responsive information associated with performance of the action. For example, the response data 425 may represent a status update corresponding to performance of the operation (e.g., "more information needed," "failed," "success," an indication of the cause of error in performance of the action, etc.), information requested as part of performance of the action (e.g., if the action to be performed is a query for information (e.g., if the action represents retrieval of information corresponding to "what is the weather today," the responsive information may be the corresponding weather forecast "cloudy with a 50% chance of rain")), or the like, as is further discussed with respect to FIG. 5.

Figure 5:
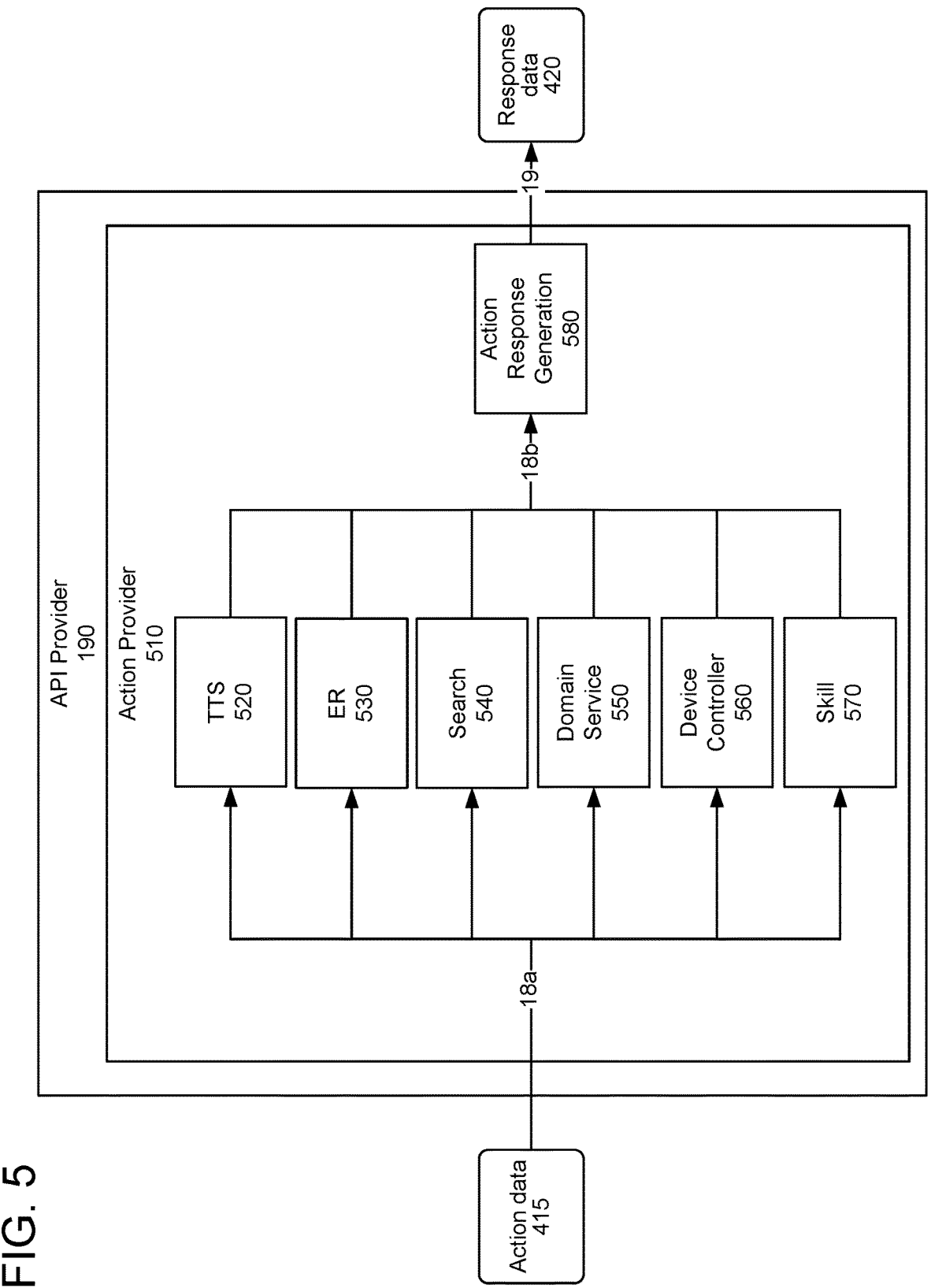
FIG. 5 is a conceptual diagram illustrating example processing of an action provider component, according to embodiments of the present disclosure.

FIG. 5 illustrates further example components included in the API provider component 190. As shown in FIG. 5, the API provider component 190 may further include the action provider component 510, which may include various components configured to perform actions corresponding to the action determined by the language model 160 to be responsive to the user input. The action provider component 510 may include a TTS component 520, which may be configured to process textual or tokenized input to generate audio data representing synthesized speech corresponding to the textual or tokenized input spoken by a synthetic voice. The processing of the TTS component 520 is discussed in detail below with respect to FIG. 6. The action provider component 510 may further include an entity resolution (ER) component 530, which may be configured to process textual or tokenized input to link one or more entity references included in the textual or tokenized input to a specific corresponding entity known to the system 100. For example, based on the textual or tokenized input (e.g., a context of the textual or tokenized input), the ER component 530 may determine that a reference to "Neil Armstrong" is directed to the American astronaut. In some embodiments, the action data 415 may include an indication(s) (e.g., slots) of one or more entities included in the user input, as determined by the language model 160, in which case the ER component 530 may process to link the one or more entities to the specific, referenced, entity known to the system 100.

In other embodiments, the ER component 530 may be configured to process the action data 415 to determine the one or more entities included in the user input and link the one or more determined entities to the specific, referenced, entity known to the system 100. For example, the ER component 530 may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component 530 links a slot of text data to a specific entity known to the system. To perform entity resolution, the ER component 530 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

The action provider component 510 may further include a search component 540, which may be configured to query a storage (e.g., a database, repository, knowledge base, etc.) for information usable for generating a response to a user input. For example, if the action data 415 represents a request for information of "Who won the game between [Team 1 Name] and [Team 2 Name]," then the search component 540 may query the storage (or other sources, such as the Internet), to retrieve the information "[Team 1 Name] won the game between [Team 1 Name] and [Team 2 Name]."

The action provider component 510 may further include a domain service component 550, which may be configured for interacting with one or more services defined by particular users, such as developers, specialists, or the like (e.g., to receive information, such as responses or annotations, to cause an action to be performed, etc.).

The action provider component 510 may further include a device controller component 560, which may be configured to cause a device to perform an action corresponding to the action data 415. For example, if the action represented by action data 415 is to turn on a living room light (e.g., "turn_on_device (device="living room light")), then the device controller component 560 may identify the corresponding living room light, and instruct the living room light to power on (e.g., change its state to {state: ON}).

The action provider component 510 may further include a skill component 570. A skill component may be software running on the system component(s) 120 that is akin to a software application. That is, a skill component 570 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 570. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 570 may operate in conjunction between the system component(s) 120 and other devices, such as the user device 110, in order to complete certain functions. A skill component 570 may include hardware, software, firmware, or the like that may be dedicated to a particular skill component 570 or shared among different skill components 570.

The action data 415 may be sent (at step 18*a*) to the corresponding component(s) of the action provider (e.g., based on the API call represented in the action data 415 corresponding to a particular application associated with corresponding component(s)). The corresponding component(s) may process to perform the action and send (at step 18*b*) responsive information associated with performance of the action to the action response generation component 580. The action response generation component 580 may use the responsive information to generate response data 420 representing the responsive information (e.g., a concatenated representation of the responsive information, a formatted representation of the responsive information, etc.). The action response generation component 580 (or the action provider component 510 or the API provider component 190) may send (at step 19) the response data 420 to the action plan execution component 180.

With reference to FIG. 4, the action plan execution component 180 sends (at step 20) the response data 425 to the language model prompt generation component 150 to generate a new prompt for the language model 160. In some embodiments, the language model prompt generation component 150 may be configured to generate an updated prompt for the language model 160. For example, for a subsequent iteration of processing using the LLM orchestrator 130 (e.g., generation of a subsequent prompt for the language model 160 during processing of a current user input) the language model prompt generation component 150 may be configured to generate a prompt that includes one or more previous prompts generated by the language model prompt generation component 150 during processing of the current user input. For example, during the previous iteration of processing (e.g., after generating the previous prompt at step 6, after generating the previous model output at step 7, etc.) the LLM orchestrator 130 may store information associated with the processing performed (e.g., the generated prompt, the model output, etc.) in an agent memory storage 310. The agent memory storage 310 may, therefore, include various information associated with one or more previous iterations of processing by the LLM orchestrator 130 for the current user input/the user input data 127.

As such, when the language model prompt generation component 150 receives the response data 425, the language model prompt generation component 150 may query (step 21) the agent memory storage 310 for previous iteration data 430 representing the information associated with one or more previous iterations of processing by the LLM orchestrator 130 for the current user input. In some embodiments, the LLM orchestrator 130 may further store the responsive information represented by the response data 425 in the agent memory storage 310.

The language model prompt generation component 150 may process as described herein above with respect to FIG. 1, but with respect to the response data 425 and the previous iteration data 430, to generate prompt data 435 representing a prompt for the language model 160 including the responsive information from the API provider component 190 and contextual information from the one or more previous iterations of processing by the LLM orchestrator 130 for the current user input. For example, continuing the example provided above with respect to the user input "turn on the living room light," if the response data 425 corresponds to the responsive information "success," indicating that the action of turning on the living room light was successful, then the prompt data 435 may represent the prompt:

```
{
You have access to the following API's:
Routine.turn_on_device(device: str) turn a device on.
Use the following format:
User: the input utterance of a user
Thought: optionally think about what to do
Action: take an action by calling APIs
Observation: what the API execution returns
... (this thought/action/action input/observation can repeat N times)
Thought: done
Response: the proper response to the user (end of turn)
Examples:
User: turn on all indoor lights
Thought: the user is trying to turn lights on
Action: turn_on_device(device="indoor light 1")
```

-continued

```
turn_on_device(device="indoor light 2")
Observation: success
success
Thought: time to respond
Response: Anything else I can help you with?
User: turn on the living room light
Thought: the user is trying to turn on the living room light
Action: turn_on_device(device="living room light")
Observation: Success
}
```

The language model prompt generation component 150 may send (at step 22) the prompt data 435 to the language model 160, which may process the prompt data 435 as described herein above with respect to FIG. 1 to generate model output data 440 representing a response to the prompt. For example, based on processing the foregoing example prompt data, the language model 160 may output model output data 440: "Thought: time to respond Response: The living room light is now on, anything else I can help you with," or the like. The model output data 440 may be sent (at step 23) to the action plan generation component 170, which may determine that the language model 160 has generated a response to the user input and thereafter the LLM orchestrator 130 may output (at step 24) the output data 320. In some embodiments, the system 100 may send the output data 320 to another component of the system (e.g., the TTS component 520) for further processing, and thereafter, may cause output of the response generated by the language model 160 (e.g., cause the user device 110 to present audio/visual data corresponding to the output data 320). In other embodiments, the output data 320 may correspond to the response generated by the API provider component 190 (e.g., the response data 420), such as, for example, output audio data generated by the TTS component 520, text and/or graphics for display, etc. This output data 320 may be sent to the user device 110 for output to the user 105.

As another example of the processing (e.g., illustrated as steps 10-24) of the system 100 to generate an action responsive to a user input, the system 100 may receive a user input of "how many people live in the capital of France" and may process as described herein above (with respect to steps 10-14) to determine additional relevant information (e.g., API data, exemplar data, device state data, and/or other context data). The language model prompt generation component 150 may process the user input and the additional relevant information to generate the prompt data:

```
{
You have access to the following API's:
InfoQA.get_answer ({"question": str}).
Use the following format:
User: the input utterance of a user
Thought: optionally think about what to do
Action: take an action by calling APIs
Observation: what the API execution returns ... (this
thought/action/action input/observation can repeat N times)
Response: the proper response to the user (end of turn).
Examples:
User: How many people live in the United States
Action: InfoQA.get_answer({"question":"How many people live
in the United States?"})
Observation: In 2021, the population of the United States was
332.28 million
```

```
Thought: I need to generate a response
Response: 332.28 million people live in the United States
User: How many people live in the capital of France?
}
```

Based on processing the foregoing example prompt data, the language model 160 may output model output data: "Action: InfoQA.get_answer ({"question": "How many people live in the capital of France?"})," or the like. In some embodiments, the language model 160 may perform one or more forms of processing to the user input when generating the action responsive to the user input. For example, the language model 160 may be capable of performing at least a portion of ER processing. As such, in some embodiments, the language model 160 may output model output data: "Action: InfoQA.get_answer ({"question": "How many people live in Paris?"})," where the "capital of France" is resolved as the entity "Paris."

Continuing the example, the action plan generation component 170 may parse the model output data to determine an action plan representing the action (e.g., InfoQA.get_answer ({"question": "How many people live in Paris?"})), and the action plan execution component 180 sends the action request to the API provider (e.g., the search component 540), which may determine corresponding responsive information (e.g., 2.14 million people, which is the population of Paris). As discussed above, the language model prompt generation component 150 may use the responsive information and the previous prompt to generate an updated prompt of:

```
{
You have access to the following API's:
InfoQA.get_answer ({"question": str}).
Use the following format:
User: the input utterance of a user
Thought: optionally think about what to do
Action: take an action by calling APIs
Observation: what the API execution returns ... (this
thought/action/action input/observation can repeat N times)
Response: the proper response to the user (end of turn).
Examples:
User: How many people live in the United States
Action: InfoQA.get_answer({"question":"How many people live
in the United States?"})
Observation: In 2021, the population of the United States was
332.28 million
Thought: I need to generate a response
Response: 332.28 million people live in the United States
User: How many people live in the capital of France?
Action: InfoQA.get_answer({"question":"How many people live
in Paris?"})
Observation: In 2019, the population of Paris was 2.14 million
people
}
```

Based on processing the foregoing example prompt, the language model 160 may output model output data: "Thought: I need to generate a response; Response: 2.14 million people live in Paris," or the like.

Although the LLM orchestrator 130 is illustrated as performing a particular number of operations, the herein disclosure is not so limited. In some embodiments, the LLM orchestrator 130 may perform one or more iterations of processing (e.g., as described herein above with respect to steps 10-16 or steps 10-23) until the LLM orchestrator 130 determines that a stopping condition has been met. For example, the LLM orchestrator 130 may determine that a stopping condition has been met if the LLM orchestrator 130 determines that the user input data 127 does not include a user input (e.g., the user input data 127 does not include data, the user input data 127 includes an error value (e.g., a NULL value), the user input data 127 does not include text or tokens, etc.). For further example, the LLM orchestrator 130 may determine that a stopping condition has been met if the LLM orchestrator 130 determines that the model output generated by the language model 160 does not include an action to be performed (e.g., the model output represents that the language model 160 determined that there is no action to be performed). As another example, the LLM orchestrator 130 may determine that a stopping condition has been met if the LLM orchestrator 130 determines that a particular type of action has been performed as a result of the processing of the LLM orchestrator 130 (e.g., a response has been output to the user, such as an audio response (e.g., output of audio generated by the TTS component 520), a visual response, etc.). As an even further example, the LLM orchestrator 130 may determine that a stopping condition has been met if the LLM orchestrator 130 determines that the model output of the language model 160 indicates that the action to be performed corresponds to an "exit" action (e.g., which may be listed as an API available to the language model 160 in the prompt provided to the language model 160).

Figure 6:
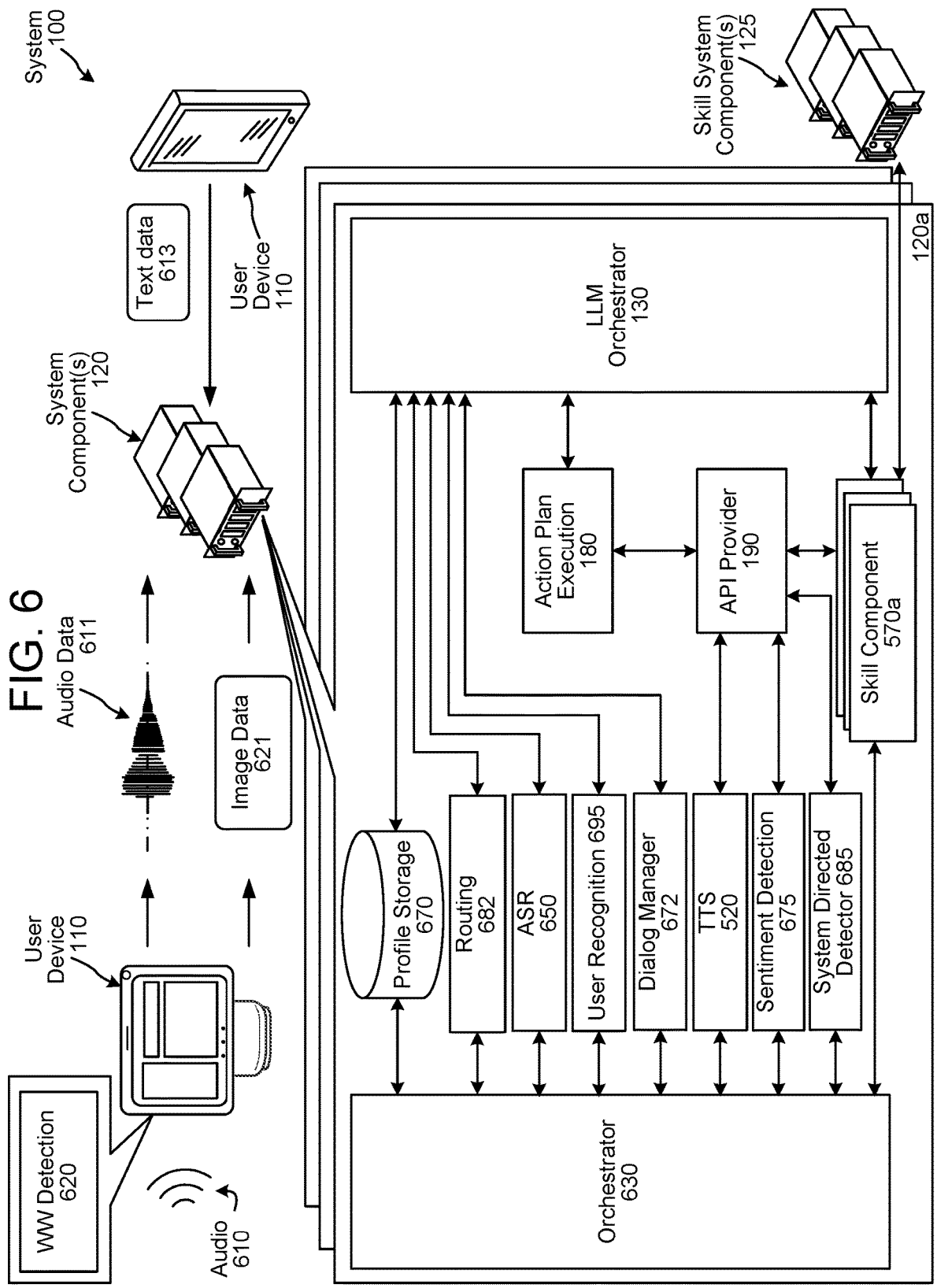
FIG. 6 is a conceptual diagram of components of the system, according to embodiments of the present disclosure.

The system 100 may operate using various components as described in FIG. 6. The various components may be located on same or different physical devices. Communication between various components may occur directly or across a network(s) 199. The user device 110 may include audio capture component(s), such as a microphone or array of microphones of a user device 110, captures audio 610 and creates corresponding audio data. Once speech is detected in audio data representing the audio 610, the user device 110 may determine if the speech is directed at the user device 110/system component(s) 120. In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of user device 110. Other input forms may include indication that the user has pressed a physical or virtual button on user device 110, the user has made a gesture, etc. The user device 110 may also capture images using camera(s) 818 of the user device 110 and may send image data 621 representing those image(s) to the system component(s). The image data 621 may include raw image data or image data processed by the user device 110 before sending to the system component(s). The image data 621 may be used in various manners by different components of the system to perform operations such as determining whether a user is directing an utterance to the system, interpreting a user command, responding to a user command, etc.

The wakeword detection component 620 of the user device 110 may process the audio data, representing the audio 610, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data;

the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 610, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the user device 110 may "wake" and begin transmitting audio data 611, representing the audio 610, to the system component(s) 120. The audio data 611 may include data corresponding to the wakeword; in other embodiments, the portion of the audio corresponding to the wakeword is removed by the user device 110 prior to sending the audio data 611 to the system component(s) 120. In the case of touch input detection or gesture-based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 620 may result in sending audio data to the system component(s) 120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component(s) c) and/or such skills/systems may be coordinated by one or more skill component(s) 570 of one or more system component(s) 120.

The user device 110 may also include a system directed input detector 785. (The system component(s) may also include a system directed input detector 685 which may operate in a manner similar to system directed input detector 785.) The system directed input detector 785 may be configured to determine whether an input to the system (for example speech, a gesture, etc.) is directed to the system or not directed to the system (for example directed to another user, etc.). The system directed input detector 785 may work in conjunction with the wakeword detection component 620. If the system directed input detector 785 determines an input is directed to the system, the user device 110 may "wake" and begin sending captured data for further processing (for example, processing audio data using the ASR component 650/750, or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 785 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 785 is determining whether an input is potentially device directed. For example, the system may output an orange indicator while considering an input, and may output a green indicator if a system directed input is detected. Other such configurations are possible.

Upon receipt by the system component(s) 120, the audio data 611 may be sent to an orchestrator component 630 and/or the LLM orchestrator 130. The orchestrator component 630 may include memory and logic that enables the orchestrator component 630 to transmit various pieces and forms of data to various components of the system, as well as perform other operations as described herein. In some embodiments, the orchestrator component 630 may optionally be included in the system component(s) 120. In embodiments where the orchestrator component 630 is not included in the system component(s) 120, the audio data 611 may be sent directly to the LLM orchestrator 130. Further, in such embodiments, each of the components of the system component(s) 120 may be configured to interact with the LLM orchestrator 130, the action plan execution component 180, and/or API provider component 190.

In some embodiments, the system component(s) 120 may include a routing component 682, which may be configured to determine whether the orchestrator component 630 and/or the LLM orchestrator 130 are to process with respect to the audio data 611. In some embodiments, the routing component 682 may determine the orchestrator component 630 and/or the LLM orchestrator 130 are to process with respect to the audio data 611 based on metadata associated with the audio data 611. For example, the routing component 682 may be a classifier configured to process a natural language representation of the audio data 611 (e.g., output by the ASR component 650) and classify the corresponding user input as requiring the processing of the orchestrator component 630 and/or the LLM orchestrator 130. For further example, the routing component 682 may determine whether the device from which the audio data 611 is received is associated with an indicator representing the audio data 611 is to be processed by the orchestrator component 630 and/or the LLM orchestrator 130. As an even further example, the routing component 682 may determine whether the user (e.g., determined using data output from the user recognition component 695) from which the audio data 611 is received is associated with a user profile including an indicator representing the audio data 611 is to be processed by the orchestrator component 630 and/or the LLM orchestrator 130. As another example, the routing component 682 may determine whether the audio data 611 (or the output of the ASR component 650) corresponds to a request representing that the audio data 611 is to be processed by the orchestrator component 630 and/or the LLM orchestrator 130 (e.g., a request including "let's chat" may represent that the audio data 611 is to be processed by the LLM orchestrator 130). In some embodiments, if the routing component 682 is unsure (e.g., a confidence score corresponding to whether the orchestrator component 630 and/or the LLM orchestrator 130 is to process is below a threshold), then the routing component 682 may send the audio data 611 to both of the orchestrator component 630 and the LLM orchestrator 130. In such embodiments, the orchestrator component 630 and/or the LLM orchestrator 130 may include further logic for determining further confidence scores during processing representing whether the orchestrator component 630 and/or the LLM orchestrator 130 should continue processing.

The routing component 682 may send the audio data 611 to an ASR component 650. In some embodiments, the component selected to process the audio data 611 (e.g., the orchestrator component 630 and/or the LLM orchestrator 130) may send the audio data 611 to the ASR component 650. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to the routing component 682, the orchestrator component 630, and/or the LLM orchestrator 130. In instances where the text data is sent to the routing component 682, the routing component 682 may send the text data to the component selected to process the audio data 611 (e.g., the orchestrator component 630 and/or the LLM orchestrator 130). The text data sent from the ASR component 650 to the routing component 682, the orchestrator component 630, and/or the LLM orchestrator 130 may include a single top-scoring ASR hypothesis or may include an N-best list including multiple top-scoring ASR hypotheses. An N-best list may additionally include a respective score associated with each ASR hypothesis represented therein.

A skill system component(s) 125 may communicate with a skill component(s) 570 within the system component(s) 120, directly with the orchestrator component 630, and/or the API provider component 190, or with other components. Inputs to a skill component 570 may come from speech processing interactions or through other interactions or input sources. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 570 dedicated to interacting with the skill system component(s) 125. Unless expressly stated otherwise, reference to a skill, skill device, or skill component may include a skill component 570 operated by the system component(s) 120 and/or skill operated by the skill system component(s) 125. Moreover, the functionality described herein as a skill or skill may be referred to using many different terms, such as an action, bot, app, or the like. The skill component 570 and or skill system component(s) 125 may return output data to the orchestrator component 630.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 672 that manages and/or tracks a dialog between a user and a device. As used herein, a "dialog" may refer to multiple related user inputs and system 100 outputs (e.g., through device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 672 may associate a dialog session identifier with the dialog upon identifying that the user is engaging in a dialog with the user. The dialog manager component 672 may track a user input and the corresponding system generated response to the user input as a turn. The dialog session identifier may correspond to multiple turns of user input and corresponding system generated response. The dialog manager component 672 may transmit data identified by the dialog session identifier directly to the orchestrator component 630, the LLM orchestrator 130, and/or another component. Depending on system configuration the dialog manager component 672 may determine the appropriate system generated response to give to a particular utterance or user input of a turn. Or creation of the system generated response may be managed by another component of the system (e.g., the orchestrator component 630, or the like) while the dialog manager component 672 selects the appropriate responses. Alternatively, another component of the system component(s) 120 may select responses using techniques discussed herein. The text of a system generated response may be sent to a TTS component 520 for creation of audio data corresponding to the response. The audio data may then be sent to a user device (e.g., user device 110) for ultimate output to the user. Alternatively (or in addition) a dialog response may be returned in text or some other form.

The dialog manager component 672 may receive the ASR hypothesis/hypotheses (i.e., text data) and make a semantic interpretation of the phrase(s) or statement(s) represented therein. That is, the dialog manager component 672 determines one or more meanings associated with the phrase(s) or statement(s) represented in the text data based on words represented in the text data. The dialog manager component 672 determines a goal corresponding to an action that a user desires be performed as well as pieces of the text data that allow a device (e.g., the user device 110, the system component(s) 120, a skill component 570, a skill system component(s) 125, etc.) to execute the intent. If, for example, the text data corresponds to "what is the weather," the dialog manager component 672 may determine that that the system component(s) 120 is to output weather information associated with a geographic location of the user device 110. In another example, if the text data corresponds to "turn off the lights," the dialog manager component 672 may determine that the system component(s) 120 is to turn off lights associated with the device(s) 110 or the user(s) 105.

The dialog manager component 672 may send the results data to one or more skill component(s) 570. If the results data includes a single hypothesis, the orchestrator component 630 and/or the LLM orchestrator 130 may send the results data to the skill component(s) 570 associated with the hypothesis (e.g., the LLM orchestrator may send the results data to the skill component(s) 570 via the action plan execution component 180 and the API provider component 190). If the results data includes an N-best list of hypotheses, the orchestrator component 630 may send the top scoring hypothesis to a skill component(s) 570 associated with the top scoring hypothesis.

The system component(s) includes a TTS component 520. The TTS component 520 may generate audio data (e.g., synthesized speech) from text data using one or more different methods. Text data input to the TTS component 520 may come from a skill component 570, the orchestrator component 630, the LLM orchestrator 130, or another component of the system. In one method of synthesis called unit selection, the TTS component 520 matches text data against a database of recorded speech. The TTS component 520 selects matching units of recorded speech and concatenates the units together to form audio data. In another method of synthesis called parametric synthesis, the TTS component 520 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 611 representing the commands to the system component(s) 120 for processing, after which the system component(s) 120 may return output data that can cause the user device 110 to engage its camera.

The system component(s) 120 may include a user recognition component 695 that recognizes one or more users using a variety of data. However, the disclosure is not limited thereto, and the user device 110 may include a user recognition component 795 instead of and/or in addition to user recognition component 695 of the system component(s) 120 without departing from the disclosure. User recognition component 795 operates similarly to user recognition component 695.

The user recognition component 695 may take as input the audio data 611 and/or text data output by the ASR component 650. The user recognition component 695 may perform user recognition by comparing audio characteristics in the audio data 611 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform processing of the routing component 682, the orchestrator component 630, and/or the LLM orchestrator 130 as well as processing performed by other components of the system.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 675 that may be configured to detect a sentiment of a user from audio data representing speech/utterances from the user, image data representing an image of the user, and/or the like. The sentiment detection component 675 may be included in system component(s) 120, as illustrated in FIG. 6, although the disclosure is not limited thereto and the sentiment detection component 675 may be included in other components without departing from the disclosure. For example, the sentiment detection component 775 may be included in the user device 110, as a separate component, etc. Sentiment detection component 775 may operate similarly to sentiment detection component 675. The system component(s) may use the sentiment detection component 675 to, for example, customize a response for a user based on an indication that the user is happy or frustrated.

Figure 7:
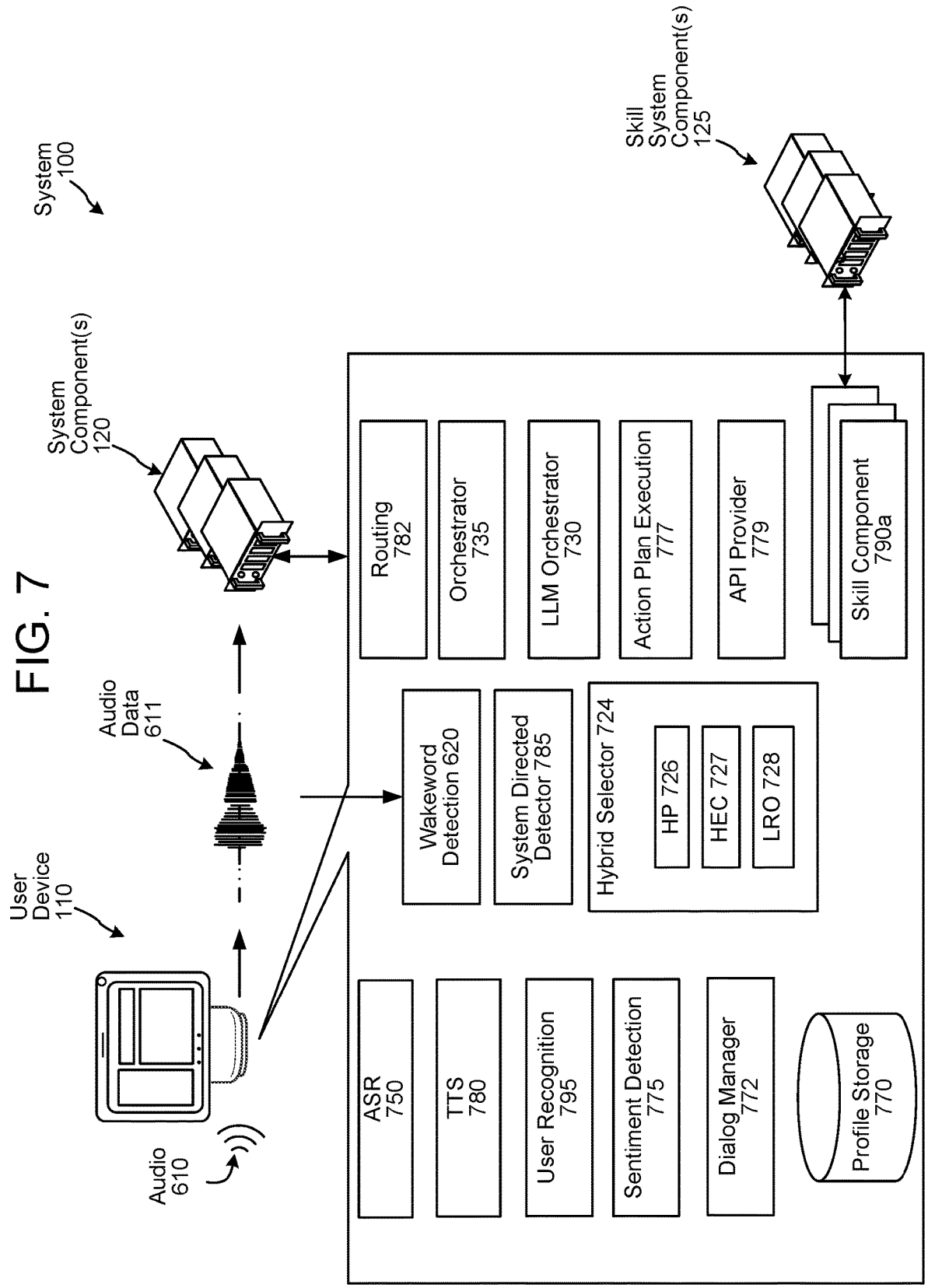
FIG. 7 is a conceptual diagram illustrating components that may be included in a device, according to embodiments of the present disclosure.

Although the components of FIG. 6 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 7 illustrates such a configured user device 110.

In at least some embodiments, the system component(s) may receive the audio data 611 from the user device 110, to recognize speech corresponding to a spoken input in the received audio data 611, and to perform functions in response to the recognized speech. In at least some embodiments, these functions involve sending directives (e.g., commands), from the system component(s) to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component 780) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 6, the user device 110 may include a wakeword detection component 620 configured to compare the audio data 611 to stored models used to detect a wakeword (e.g., "Alexa") that indicates to the user device 110 that the audio data 611 is to be processed by the device 110 (e.g., by the orchestrator 735 and/or the LLM orchestrator 730, which are configured similar to the orchestrator component 630 and the LLM orchestrator 130 respectively). In at least some embodiments, a hybrid selector 724, of the user device 110, may send the audio data 611 to the wakeword detection component 620. If the wakeword detection component 620 detects a wakeword in the audio data 611, the wakeword detection component 620 may send an indication of such detection to the hybrid selector 724. In response to receiving the indication, the hybrid selector 724 may send the audio data 611 to the system component(s) and/or the ASR component 750. The wakeword detection component 620 may also send an indication, to the hybrid selector 724, representing a wakeword was not detected. In response to receiving such an indication, the hybrid selector 724 may refrain from sending the audio data 611 to the system component(s), and may prevent the ASR component 750 from further processing the audio data 611. In this situation, the audio data 611 can be discarded.

The user device 110 may conduct its own speech processing using on-device language processing components, such as an ASR component 750, similar to the manner discussed herein with respect to the ASR component 650 of the system component(s). ASR component 750 may operate similarly to ASR component 650. The user device 110 may also internally include, or otherwise have access to, other components such as one or more skill components 790 capable of executing commands based on the output of the orchestrator 735, the LLM orchestrator 730, or other results determined by the user device 110/system component(s) (which may operate similarly to skill components 570), a routing component 782 (configured to process in a similar manner to that discussed herein with respect to the routing component 682), an action plan execution component 777 (configured to process in a similar manner to that discussed herein with respect to the action plan execution component 180), an API provider component 779 (configured to process in a similar manner to that discussed herein with respect to the API provider component 190), a user recognition component 795 (configured to process in a similar manner to that discussed herein with respect to the user recognition component 695 of the system component(s)), profile storage 770 (configured to store similar profile data to that discussed herein with respect to the profile storage 670 of the system component(s)), or other components. In at least some embodiments, the profile storage 770 may only store profile data for a user or group of users specifically associated with the user device 110. Similar to as described above with respect to skill component 570, a skill component 790 may communicate with a skill system component(s) 125. The user device 110 may also have its own TTS component 780. The TTS component 780 may operate similarly to TTS component 520.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector 724, of the user device 110, may include a hybrid proxy (HP) 726 configured to proxy traffic to/from the system component(s). For example, the HP 726 may be configured to send messages to/from a hybrid execution controller (HEC) 727 of the hybrid selector 724. For example, command/directive data received from the system component(s) can be sent to the HEC 727 using the HP 726. The HP 726 may also be configured to allow the audio data 611 to pass to the system component(s) while also receiving (e.g., intercepting) this audio data 611 and sending the audio data 611 to the HEC 727.

In at least some embodiments, the hybrid selector 724 may further include a local request orchestrator (LRO) 728 configured to notify the ASR component 750 about the availability of new audio data 611 that represents user speech, and to otherwise initiate the operations of local language processing when new audio data 611 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 611 is received, the HP 726 may allow the audio data 611 to pass through to the system component(s) and the HP 726 may also input the audio data 611 to the on-device ASR component 750 by routing the audio data 611 through the HEC 727 of the hybrid selector 724, whereby the LRO 728 notifies the ASR component 750 of the audio data 611. At this point, the hybrid selector 724 may wait for response data from either or both of the system component(s) or the local language processing components. However, the disclosure is not limited thereto, and in some examples the hybrid selector 724 may send the audio data 611 only to the local ASR component 750 without departing from the disclosure. For example, the user device 110 may process the audio data 611 locally without sending the audio data 611 to the system component(s).

The local ASR component 750 is configured to receive the audio data 611 from the hybrid selector 724, and to recognize speech in the audio data 611. The user device 110 and/or the system component(s) may associate a unique identifier with each natural language user input. The user device 110 may include the unique identifier when sending the audio data 611 to the system component(s), and the response data from the system component(s) may include the unique identifier to identify which natural language user input the response data corresponds.

In at least some embodiments, the user device 110 may include, or be configured to use, one or more skill components 790 that may work similarly to the skill component(s) 570 implemented by the system component(s). The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 790, a skill system component(s) 125, or a combination of a skill component 790 and a corresponding skill system component(s) 125.

Similar to the manner discussed with regard to FIG. 6, the local user device 110 may be configured to recognize multiple different wakewords and/or perform different categories of tasks depending on the wakeword. Such different wakewords may invoke different processing components of local user device 110 (not illustrated in FIG. 7). For example, detection of the wakeword "Alexa" by the wakeword detection component 620 may result in sending audio data to certain language processing components (e.g., the ASR component 750)/skill components 790 for processing while detection of the wakeword "Computer" by the wakeword detector may result in sending audio data different language processing components/skill components 790 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
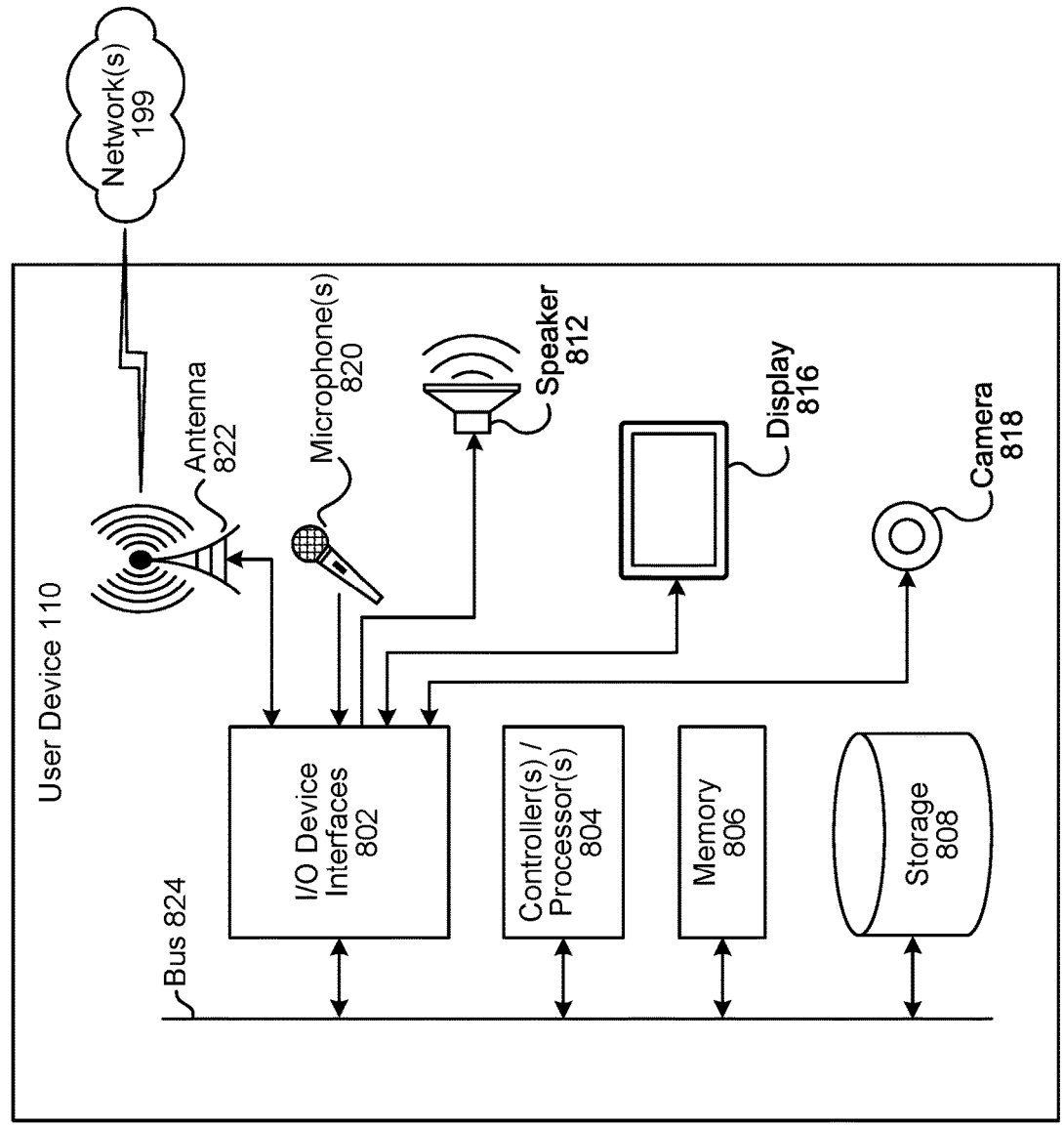
FIG. 8 is a block diagram conceptually illustrating example components of a device, according to embodiments of the present disclosure.
Figure 9:
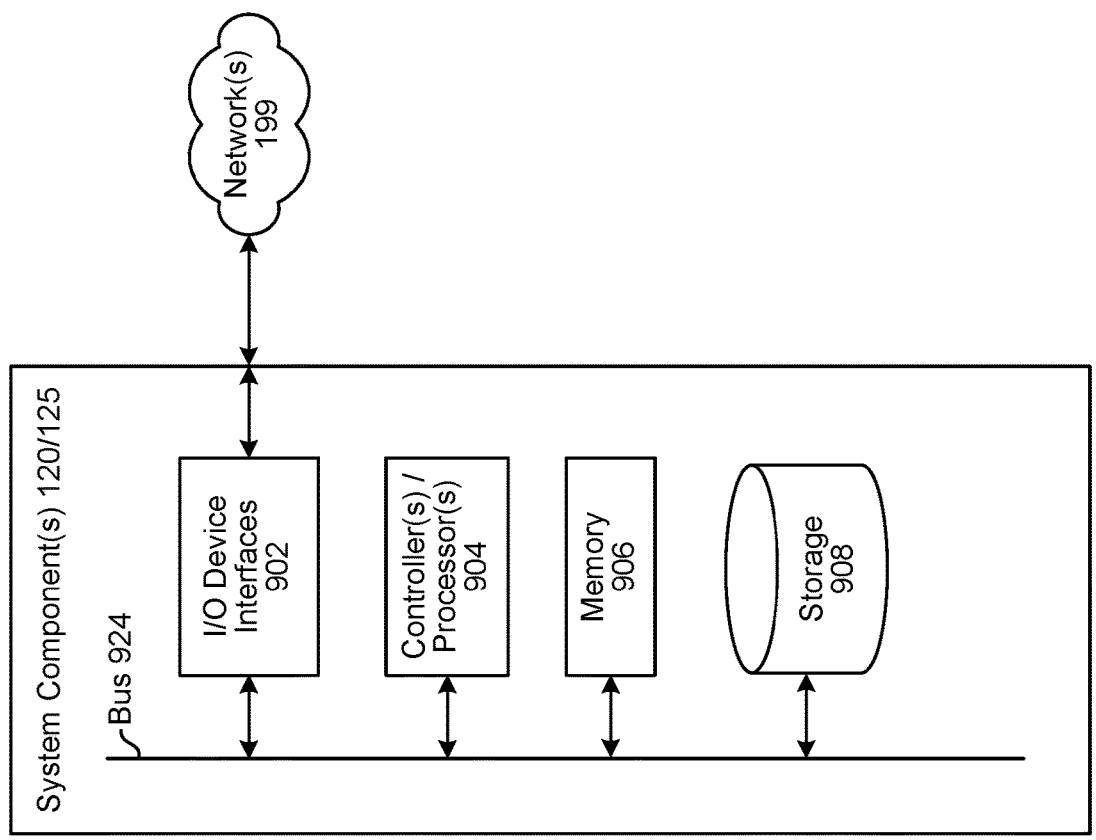
FIG. 9 is a block diagram conceptually illustrating example components of a system, according to embodiments of the present disclosure.

FIG. 8 is a block diagram conceptually illustrating a user device 110 that may be used with the system. FIG. 9 is a block diagram conceptually illustrating example components of a remote device, such as the natural language command processing system component(s), which may assist with ASR processing, and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) may be located remotely from the user device 110 as its operations may not require proximity to the user. The server/system component(s) may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/125) may be included in the overall system 100 of the present disclosure, such as one or more natural language processing system component(s) 120 for performing ASR processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the user device 110 may include input/output device interfaces 802 that connect to a variety of components such as an audio output component such as a speaker 812, a wired headset or a wireless headset (not illustrated), or other component capable of outputting audio. The user device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 816 for displaying content. The user device 110 may further include a camera 818.

Via antenna(s) 822, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the natural language command processing system component(s), or a skill system component(s) 125 may include their own dedicated processors, memory, and/or storage. Alternatively, one or more of the components of the device(s) 110, the natural language command processing system component(s), or a skill system component(s) 125 may utilize the I/O interfaces (802/902), processor(s) (804/904), memory (806/906), and/or storage (808/908) of the device(s) 110, natural language command processing system component(s), or the skill system component(s) 125, respectively. Thus, the ASR component 650 may have its own I/O interface(s), processor(s), memory, and/or storage, and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s), and a skill system component(s) 125, as described herein, are illustrative, and may be located as a stand-alone device or may be included, in whole or in part, as a component of a larger device or system. As can be appreciated, a number of components may exist either on a system component(s) and/or on user device 110. For example, ASR component 650/750), TTS component 520/780), etc., for example as illustrated in FIGS. 6 and 7. Unless expressly noted otherwise, the system version of such components may operate similarly to the device version of such components and thus the description of one version (e.g., the system version or the local version) applies to the description of the other version (e.g., the local version or system version) and vice-versa.

Figure 10:
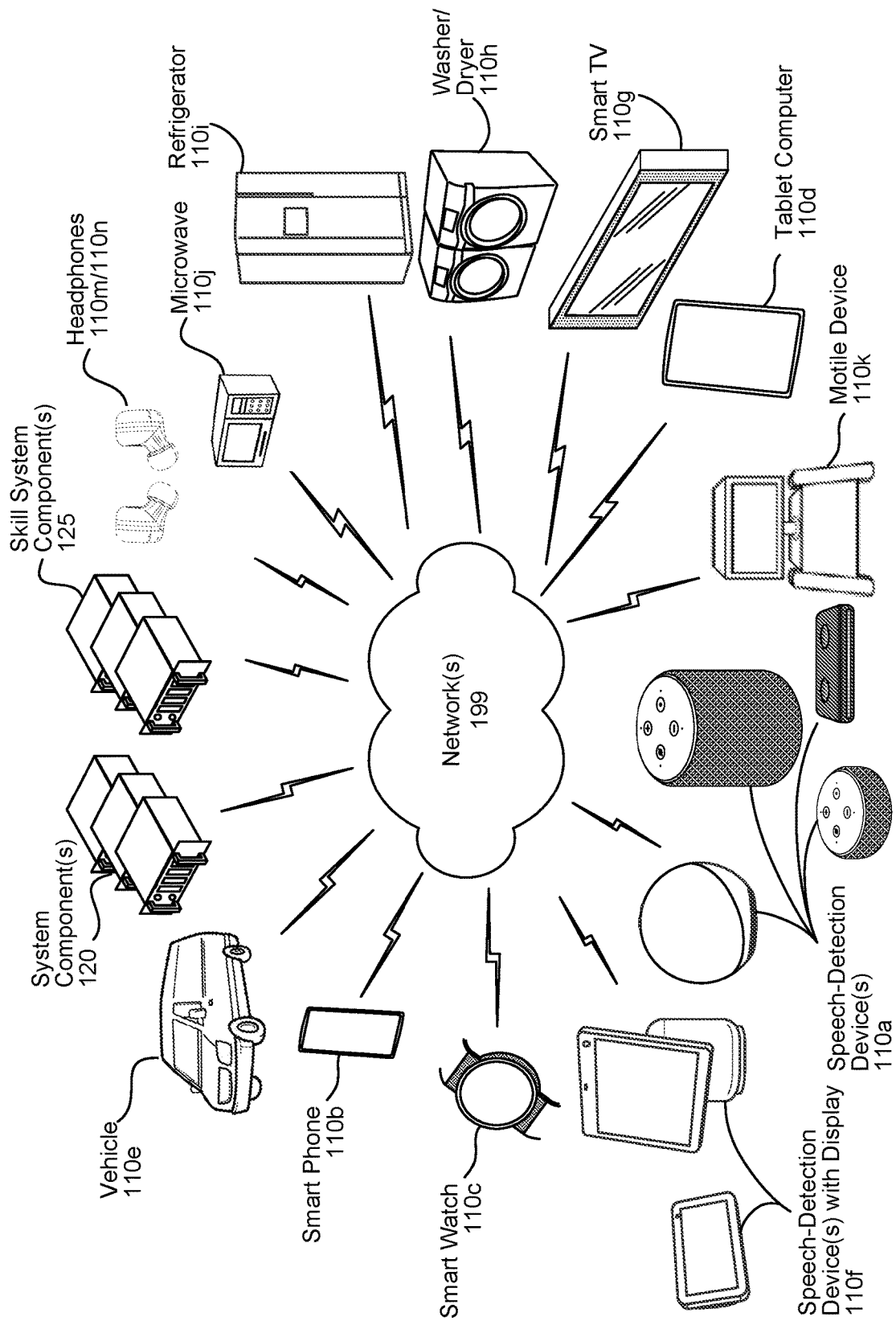
FIG. 10 illustrates an example of a network for use with the overall system, according to embodiments of the present disclosure.

As illustrated in FIG. 10, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, or other components of the same device or another device connected via the network(s) 199, such as the ASR component 650 of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can" "could" "might" "may" "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving input audio data representing a first spoken input;
   performing automatic speech recognition (ASR) processing using the input audio data to generate a transcript of the first spoken input;
   based on the transcript, determining a first set of actions potentially corresponding to the first spoken input;
   based on the transcript and the first set of actions, determining first exemplar data, the first exemplar data including a first example user input similar to the first spoken input, a first action of the first set of actions to be performed in response to the first example user input, and a system response to be generated in response to the first example user input;
   determining the first action is associated with performance of an action using a device;
   based on determining the first action is associated with performance of the action using the device:
      determining a user profile associated with the first spoken input,
      determining a first device associated with the user profile, wherein the first device is capable of performing the first action, and
      determining first state data representing a first device state of the first device;
   determining a first prompt including the first set of actions, the first exemplar data, the first device state, and the transcript, wherein the first prompt is an input for a language model to determine an output responsive to the first spoken input;
   processing, using the language model, the first prompt to generate first output data indicating the first action is to be performed in response to the first spoken input and a first natural language response is to be presented;
   causing the first device to perform the first action;
   receiving first response data indicating performance of the first action; and
   based at least in part on receiving the first response data, causing presentation of the first natural language response.

2. The computer-implemented method of claim 1, further comprising:
   determining a second prompt including the first prompt and the first response data;
   processing, using the language model, the second prompt to generate second model output data indicating a second action is to be performed and a second natural language response is to be presented;
   causing a first component to perform the second action;
   receiving, from the first component, second response data indicating performance of the second action; and
   based at least in part on receiving the second response data, causing presentation of the second natural language response.

3. The computer-implemented method of claim 1, wherein the first spoken input corresponds to a first request to power on the first device, and the method further comprises:

based on the first spoken input corresponding to the first request to power on the first device, determining first data representing a second request for:
a set of actions associated with powering on the device, exemplar data associated with the set of actions, and
a device state of the first device, wherein the first set of actions, the first exemplar data, and the first state data are determined further based on the first data.

4. The computer-implemented method of claim 1, further comprising:
determining an action definition corresponding to the first action;
determining that the action definition is semantically similar to the first spoken input; and
based on determining that the action definition is semantically similar to the first spoken input, including the first action in the first set of actions, wherein determining the first exemplar data is based on the first exemplar data being associated with the first action.

5. A computer-implemented method comprising:
receiving first natural language input data representing a first user input;
based on the first natural language input data, determining a first set of actions available with respect to the first user input, the first set of actions including at least a first action performable by a component;
based on the first natural language input data and the first set of actions including the first action, determining first data including a first example user input similar to the first user input and a first system response to be generated in response to the first example user input;
based on the first set of actions including the first action, determining second data associated with performing the first action;
determining a first prompt including the first natural language input data, the first set of actions, the first data, and the second data;
processing, using a language model, the first prompt to generate first output data indicating the first action is to be performed by the component; and
causing performance of the first action.

6. The computer-implemented method of claim 5, further comprising:
receiving first response data associated with performance of the first action by the component;
processing the first prompt and the first response data to determine a second prompt associated with the first user input and the first response data;
processing, using the language model, the second prompt to generate second model output data indicating a first response is to be presented; and
causing presentation of the first response.

7. The computer-implemented method of claim 5, wherein:
the first action corresponds to outputting audio data corresponding to first natural language data included in the first output data,
causing performance of the first action by the component comprises causing a first the component to perform the first action, the component configured to perform text-to-speech processing, and
the method further comprises:
receiving, from the component, first response data indicating performance of the first action; and
based on receiving the first response data and the first action corresponding to outputting the audio data, ceasing further processing of the first user input by the language model.

8. The computer-implemented method of claim 5, wherein the first user input corresponds to a first request to power on a first device, and the method further comprises:
based on the first user input corresponding to the first request to power on the first device, determining third data representing a second request for:
a set of actions associated with powering on a device, exemplar data associated with the set of actions, the exemplar data including an example user input similar to the first user input and a system response to be generated in response to the example user input, and
a device state of the first device, wherein the first set of actions and the first data are determined further based on the first data.

9. The computer-implemented method of claim 5, wherein determining the second data further comprises:
determining the first action is associated with performance of an action using a device;
based on determining the first action is associated with performance of the action using the device:
determining a user profile associated with the first user input,
determining a first device associated with the user profile, wherein the first device is capable of performing a second action associated with the first user input, and
determining third data representing a state of the first device, wherein the second data includes the third data; and
determining fourth data representing a context associated with the first user input, wherein the second data includes the fourth data.

10. The computer-implemented method of claim 5, further comprising:
determining an action definition of the first action;
determining that the action definition is semantically similar to the first user input;
based on determining that the action definition is semantically similar to the first user input, including the first action in the first set of actions,
wherein determining the first data is based on determining the first example user input is semantically similar to the first user input; and
identifying, from amongst a plurality of system responses, the first system response based on the first system response being associated with the first action and the first example user input.

11. The computer-implemented method of claim 5, further comprising:
determining third data representing a stopping condition, wherein the language model is to cease processing of a user input in response to determining the stopping condition has been satisfied;
processing the first output data to determine that the first action corresponds to the stopping condition; and
ceasing further processing of the first user input, by the language model, based on the first action satisfying the stopping condition.

12. The computer-implemented method of claim 5, further comprising:
determining third data representing a stopping condition, wherein the language model is to cease processing of a user input in response to generating output data absent of an action to be performed;
receiving first response data associated with performance of the first action by the component;
processing the first prompt and the first response data to determine a second prompt associated with the first user input and the first response data;
processing, using the language model, the second prompt to generate second model output data;
determining the second model output data corresponds to the stopping condition; and
based on the stopping condition, ceasing further processing of the first user input by the language model.

13. A computing system comprising:
at least one processor; and
at least one memory including instructions that, when executed by the at least one processor, cause the computing system to:
receive first natural language input data representing a first user input;
based on the first natural language input data, determine a first set of actions available with respect to the first user input, the first set of actions including at least a first action performable by a component;
based on the first natural language input data, determine at least a first example user input similar to the first user input;
determine first data including the first example user input and a first system response to be generated in response to the first example user input;
based on the first set of actions including the first action, determining second data associated with performing the first action;
determine a first prompt including the first natural language input data, the first set of actions, the first data, and the second data;
process, using a language model, the first prompt to generate first output data indicating the first action is to be performed by the component; and
cause performance of the first action.

14. The computing system of claim 13, wherein the at least one memory further comprises instructions that, when executed by the at least one processor, further cause the computing system to:
receive first response data associated with performance of the first action by the component;
process the first prompt and the first response data to determine a second prompt associated with the first user input and the first response data;
process, using the language model, the second prompt to generate second model output data indicating a first response is to be presented; and
cause presentation of the first response.

15. The computing system of claim 13, wherein:
the first action corresponds to outputting audio data corresponding to first natural language data included in the first output data,
the instructions that cause the computing system to cause performance of the first action by the component comprise further instructions that, when executed by the at least one processor, further cause the computing system to cause the component to perform the first action, the component configured to perform text-to-speech processing, and
the at least one memory further comprises instructions that, when executed by the at least one processor, further cause the computing system to:
receive, from the component, first response data indicating performance of the first action; and
based on receiving the first response data and the first action corresponding to outputting the audio data, cease further processing of the first user input by the language model.

16. The computing system of claim 13, wherein the first user input corresponds to a first request to power on a first device, and wherein the at least one memory further comprises instructions that, when executed by the at least one processor, further cause the computing system to:
based on the first user input corresponding to the first request to power on the first device, determine third data representing a second request for:
a set of actions associated with powering on a device, exemplar data associated with the set of actions, the exemplar data including an example user input similar to the first user input and a system response to be generated in response to the example user input, and
a device state of the first device, wherein the first set of actions and the first data are determined further based on the first data.

17. The computing system of claim 13, wherein the instructions that cause the computing system to determine the second data comprise further instructions that, when executed by the at least one processor, further cause the computing system to:
determine the first action is associated with performance of an action using a device;
based on determining the first action is associated with performance of the action using the device:
determine a user profile associated with the first user input,
determine a first device associated with the user profile, wherein the first device is capable of performing a second action associated with the first user input, and
determine third data representing a state of the first device, where the second data includes the third data; and
determine fourth data representing a context associated with the first user input, wherein the second data includes the fourth data.

18. The computing system of claim 13, wherein the at least one memory further comprises instructions that, when executed by the at least one processor, further cause the computing system to:
determine an action definition of the first action;
determine that the action definition is semantically similar to the first user input;
based on determining that the action definition is semantically similar to the first user input, include the first action in the first set of actions,
wherein determining the first data is based on determining the first example user input is semantically similar to the first user input; and
identify, from amongst a plurality of system responses, the first system response based on the first system response being associated with the first action and the first example user input.

19. The computing system of claim 13, wherein the at least one memory further comprises instructions that, when executed by the at least one processor, further cause the computing system to:
determine third data representing a stopping condition, wherein the language model is to cease processing of a user input in response to determining the stopping condition has been satisfied;

process the first output data to determine that the first action corresponds to the stopping condition; and cease further processing of the first user input, by the language model, based on the first action satisfying the stopping condition.

20. The computing system of claim 13, wherein the at least one memory further comprises instructions that, when executed by the at least one processor, further cause the computing system to:

determine third data representing a stopping condition, wherein the language model is to cease processing of a user input in response to generating output data absent of an action to be performed;

receive first response data associated with performance of the first action by the component;

process the first prompt and the first response data to determine a second prompt associated with the first user input and the first response data;

process, using the language model, the second prompt to generate second model output data;

determine the second model output data corresponds to the stopping condition; and based on the stopping condition, cease further processing of the first user input by the language model.

\* \* \* \* \*